(12) United States Patent
Ishimasa (10) Patent No.: US 8,983,284 B2
(45) Date of Patent: Mar. 17, 2015

(54) LENS BARREL AND IMAGE PICKUP APPARATUS INCLUDING THE SAME

(71) Applicant: Canon Kabushiki Kaisha, Tokyo (JP)

(72) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/101,940

(22) Filed: Dec. 10, 2013

(65) Prior Publication Data
US 2014/0169777 A1    Jun. 19, 2014

(30) Foreign Application Priority Data

Dec. 13, 2012    (JP) .................................. 2012-272576

(51) Int. Cl.
*G03B 17/00*    (2006.01)
*G02B 27/64*    (2006.01)

(52) U.S. Cl.
CPC .................................. *G02B 27/646* (2013.01)
USPC .......................................................... 396/55

(58) Field of Classification Search
CPC ...... G03B 5/00; G03B 5/02; G03B 2205/007; G03B 27/46; H04N 5/23264; H04N 5/23287
USPC ............................................................ 396/55
See application file for complete search history.

(56) References Cited

FOREIGN PATENT DOCUMENTS

JP    2010-164883 A        7/2010
JP    2010164883 A    *   7/2010

* cited by examiner

*Primary Examiner* — Clayton E LaBalle
*Assistant Examiner* — Noam Reisner
(74) *Attorney, Agent, or Firm* — Cowan, Liebowitz & Latman, P.C.

(57) ABSTRACT

A lens barrel that is capable of facilitating attachment and detachment of an image stabilizing unit with a cheap and easy configuration. An image stabilizing actuator has a coil and a magnet that are arranged so as to face to each other. A first holding member holds the coil. A second holding member holds the magnet, and is movable in a direction orthogonal to an optical axis with respect to the first holding member. A sensor detects moving amount of the second holding member in the direction orthogonal to the optical axis. A third holding member holds the sensor. The first holding member and the third holding member are attached to a flexible printed circuit board. The terminal sections of the coil and the sensor are located on the same side of the flexible printed circuit board. The third holding member is bent toward the first holding member.

9 Claims, 11 Drawing Sheets

LENS BARREL AND IMAGE PICKUP APPARATUS INCLUDING THE SAME

BACKGROUND OF THE INVENTION

1. Field of the Invention

The present invention relates to a lens barrel having an image stabilizing function and an image pickup apparatus including the lens barrel.

2. Description of the Related Art

In recent years, a technique for improving a function while reducing cost is demanded in a field of an image pickup apparatus, such as a digital still camera equipped with a lens barrel. Moreover, engineering development that reduces not only a part cost but also the overall cost owing to reduction of the number of processes for assembling a lens barrel, etc. becomes an urgent necessity.

On the other hand, since an image pickup apparatus becomes compact and normally has an image stabilizing function in recent years, an image stabilizing unit becomes compact and complex. This increases difficulties of an assembly of components of an image stabilizing unit and a work for removing the components.

Accordingly, there is a known technique that enables to arrange a plurality of driving members in a small space by arranging a driving member for image stabilization and a driving member for opening/closing a shutter on the same base plate. For example, there is a proposed configuration that arranges terminals of coils that constitute an image stabilization mechanism and terminals of an actuator that constitutes a light amount adjustment mechanism together within a half area of a cross section of a lens barrel orthogonal to an optical axis (see Japanese Laid-Open Patent Publication (Kokai) No. 2010-164883 (JP 2010-164883A)).

However, in the above-mentioned prior art, vibration detection sensors for detecting vibration in the image stabilization mechanism are arranged opposite to the side at which the coils of the image stabilization mechanism and the terminals of the light amount adjustment mechanism are arranged with respect to an optical axis direction. Accordingly, a flexible printed circuit board for connecting these terminals and the vibration detection sensors with a control unit of the image pickup apparatus becomes a double-side wiring configuration, which increases a cost.

SUMMARY OF THE INVENTION

The present invention provides a lens barrel and an image pickup apparatus using this lens barrel, which are capable of facilitating attachment and detachment of an image stabilizing unit with a cheap and easy configuration.

Accordingly, a first aspect of the present invention provides a lens barrel comprising an image stabilizing actuator configured to have a coil and a magnet that are arranged so as to face to each other, a first holding member configured to hold the coil, a second holding member configured to hold the magnet, and to be movable in a direction orthogonal to an optical axis with respect to the first holding member, a sensor configured to detect moving amount of the second holding member in the direction orthogonal to the optical axis, a third holding member configured to hold the sensor, and a flexible printed circuit board to which the first holding member and the third holding member are attached, wherein a terminal section of the coil held by the first holding member and a terminal section of the sensor held by the third holding member are located on the same side of the flexible printed circuit board, and wherein the third holding member is bent toward the first holding member.

Accordingly, a second aspect of the present invention provides a lens barrel comprising an image stabilizing actuator configured to have a coil and a magnet that are arranged so as to face to each other, a first holding member configured to hold the coil, a second holding member configured to hold the magnet, and to be movable in a direction orthogonal to an optical axis with respect to the first holding member, a sensor configured to detect moving amount of the second holding member in the direction orthogonal to the optical axis, a third holding member configured to hold the sensor, and a flexible printed circuit board to which the first holding member and the third holding member are attached, wherein terminals of the coil held by the first holding member and terminals of the sensor held by the third holding member are located on the same side of the flexible printed circuit board, and wherein the third holding member is bent toward the first holding member and is attached to the first holding member.

Accordingly, a third aspect of the present invention provides an image pickup apparatus equipped with the lens barrel according to the first aspect.

The present invention enables to facilitate attachment and detachment of the image stabilizing unit with a cheap and easy configuration.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Here, the embodiment in which the present invention is applied to what is called digital still camera of a compact type will be described.

Figure 1:
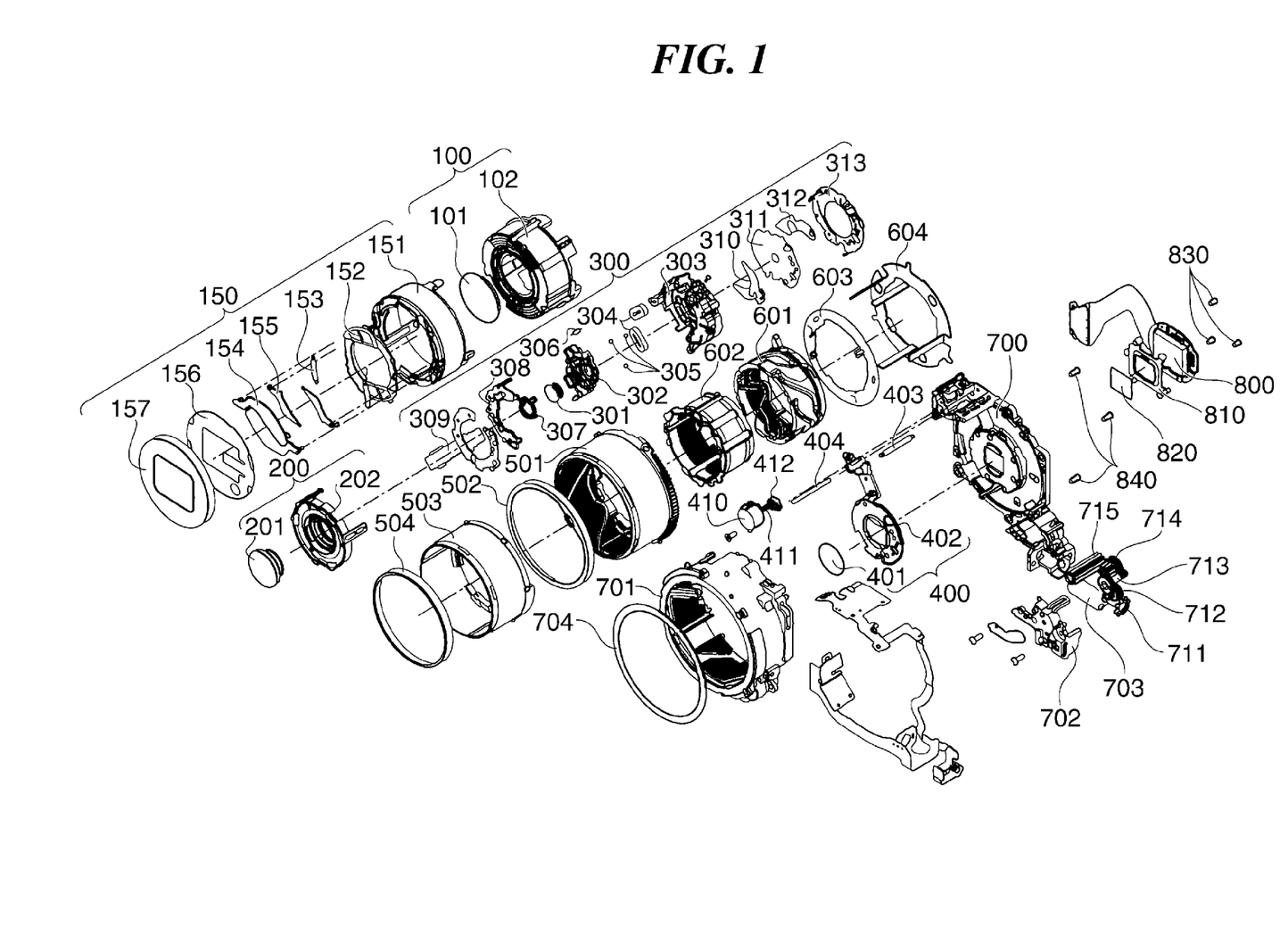
FIG. 1 is an exploded perspective view showing a lens barrel with which a digital still camera according to an embodiment of the present invention is provided.
Figure 2:
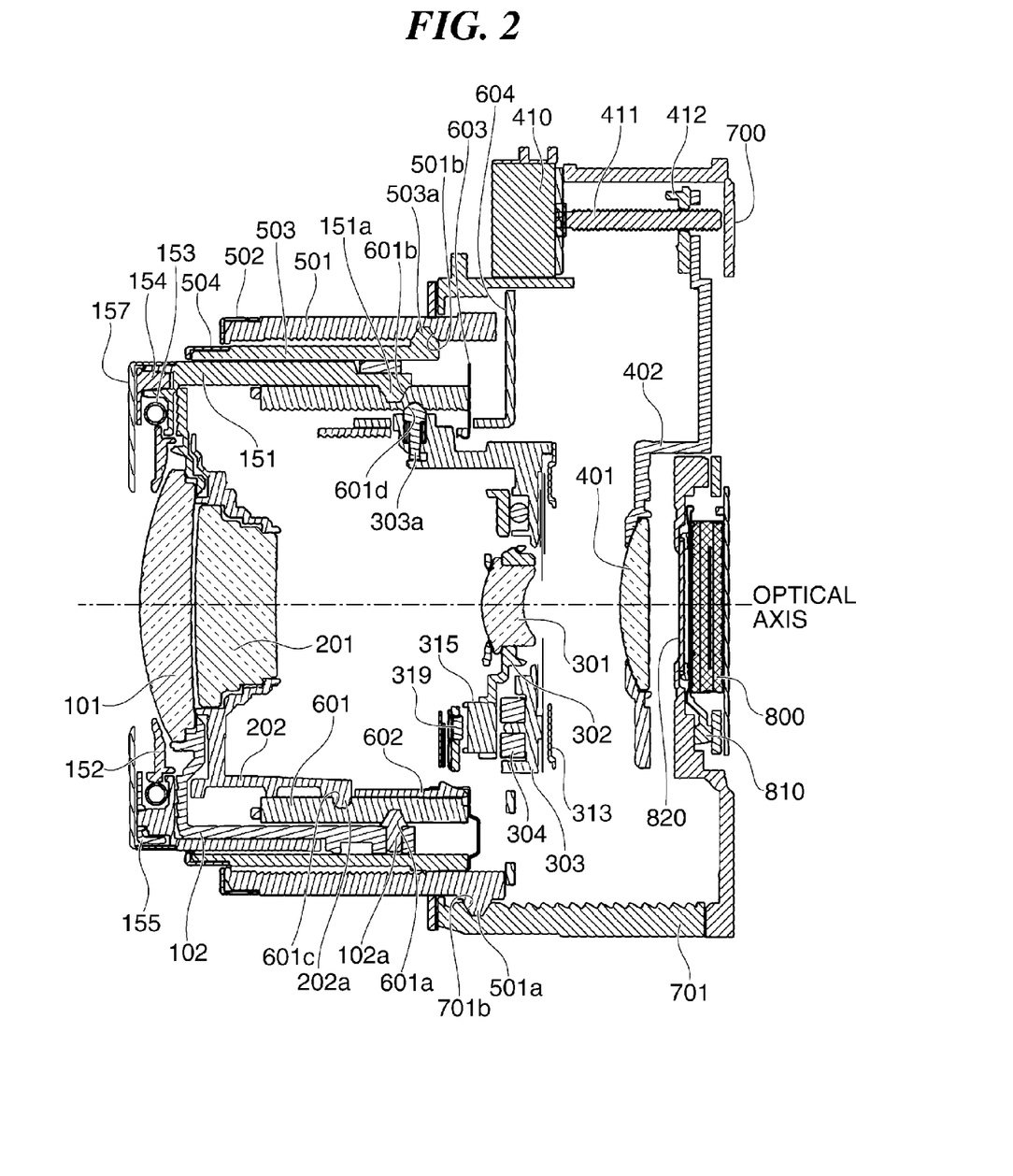
FIG. 2 is a vertical sectional view showing an image pickup unit containing the lens barrel shown in FIG. 1 in a state where the lens barrel is in an extended position (a shooting state).
Figure 3:
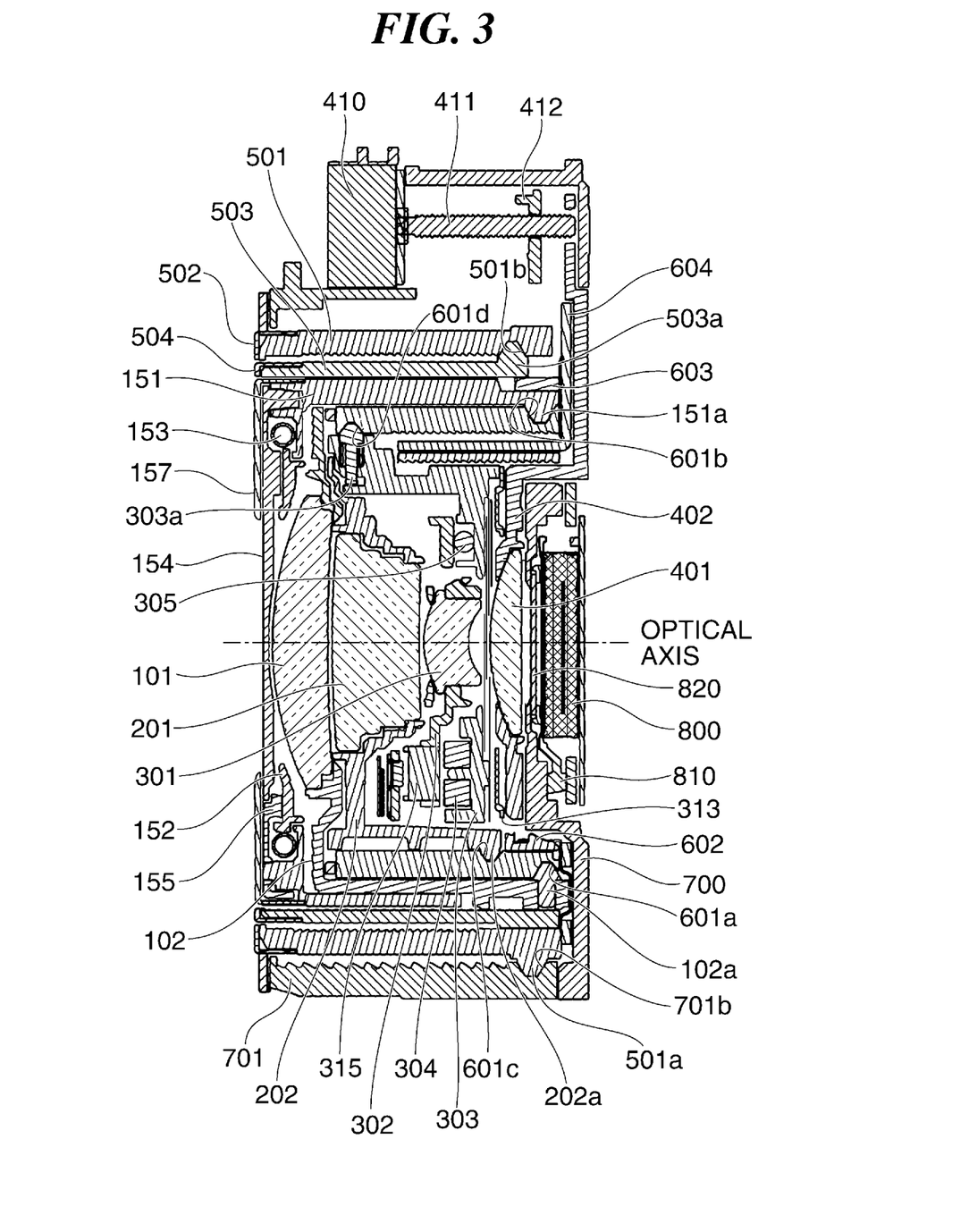
FIG. 3 is a vertical sectional view showing an image pickup unit containing the lens barrel shown in FIG. 1 in a state where the lens barrel is in a retracted position (a retracted state).

FIG. 1 is an exploded perspective view showing a lens barrel with which a digital still camera according to the embodiment of the present invention is provided. Moreover, FIG. 2 is a vertical sectional view of an image pickup unit containing the lens barrel shown in FIG. 1 in a plane including an optical axis, and shows a state where the lens barrel is in an extended position (a shooting state). Moreover, FIG. 3 is a vertical sectional view of the image pickup unit containing the lens barrel shown in FIG. 1 in the plane including the optical axis, and shows a state where the lens barrel is in a retracted position (a retracted state).

The lens barrel is provided with a first lens group 100, a second lens group 200, a third lens group 300, a fourth lens group 400, and a barrier group 150 that protects the first lens group 100.

The first lens group 100 has a first lens 101 and a cylindrical first lens frame 102 that holds the first lens 101. Cam pins 102a, which are projected inwardly in a radial direction, are arranged at equal angular intervals on an inner circumferential surface of the first lens frame 102. Moreover, key grooves (no reference numerals) that prevent the first lens group 100 from rotating are formed on the inner surface. Key grooves (no reference numeral) that prevent the barrier group 150 from rotating are formed on an outer circumferential surface of the first lens frame 102 at equal intervals in a circumferential direction. It should be noted that the cam pins 102a may be generally molded with the first lens frame 102, although the cam pins 102a fit into the first lens frame 102 as shown in FIG. 2 and FIG. 3.

The barrier group 150 has a barrier barrel 151, a barrier drive ring 152, barrier opening springs 153, main barrier blades 154, auxiliary barrier blades 155, a cap tape 156, and a cap 157. The cap 157 is attached to a subject side of the barrier barrel 151 with the cap tape 156. Cam pins 151a, which are projected inwardly in the radial direction, are arranged at equal angular intervals on an inner circumferential surface of the barrier barrel 151. Moreover, rectilinear keys (no reference numerals) that prevent the barrier group 150 from rotating are formed on the inner surface.

The second lens group 200 has a second lens 201 and a cylindrical second lens frame 202 that holds the second lens 201. Cam pins 202a, which are projected outwardly in the radial direction, are arranged at equal angular intervals on an outer circumferential surface of the second lens frame 202. Moreover, rectilinear keys (no reference numerals) that prevent the second lens group 200 from rotating are formed on the outer surface.

Since a configuration of the third lens group 300 will be described in detail with reference to FIG. 4 through FIG. 11 later, only members to which reference numerals are given in FIG. 1 through FIG. 3 will be described here. The third lens group 300 has a third group base 303 (a first holding member), shutter blades 310 that are light-amount adjusting members arranged at an imaging plane side of the third group base 303, a separate seat 311, an ND filter 312, and a shutter cover 313. Moreover, the third lens group 300 is provided with IS coils 304 arranged at the subject side of the third group base 303, IS balls 305, IS springs 306, a third lens 301, a third lens frame 302 (a second holding member), a cap 307, and an IS holder 308 (a third holding member). Furthermore, the third lens group 300 is provided with a third group FPC (flexible printed circuit board) 309, and Hall elements 319 that are magnetic field detecting elements for detecting variations of magnetic field of IS magnets 315 in order to detect moving amount of the third lens frame 302.

It should be noted that "IS" is an abbreviation of an image stabilization mechanism (Image Stabilizer) that compensates camera shake in the lens barrel. For example, the IS coil 304 means the coil for image stabilization mechanism (the coil that constitutes the image stabilization mechanism), and this is also applicable to the other IS members.

Inside the first lens frame 102, a rectilinear barrel 602, which is prevented from rotating by a linear sliding plate 604 with respect to the rotation of a cam barrel 601, is arranged. The rectilinear barrel 602 linearly guides the first lens group 100, the second lens group 200, and the third lens group 300 in the optical axis direction while preventing these lens groups from rotating.

Key grooves (no reference numerals) into which rectilinear keys (no reference numerals) arranged on the linear sliding plate 604 are fit are formed on the outer circumferential surface of the rectilinear barrel 602. Moreover, rectilinear keys (no reference numerals) that fit into key grooves (no reference numerals) of the first lens frame 102 are formed at the subject side of the rectilinear barrel 602. On the inner circumferential surface of the rectilinear barrel 602, penetrated key grooves (no reference numerals) into which rectilinear keys (no reference numerals) of the second lens frame 202 are fit to prevent the second lens frame 202 from rotating and penetrated key grooves (no reference numerals) into which rectilinear keys (no reference numerals) of the third group base 303 are fit to prevent the third group base 303 from rotating are formed at equal angular intervals.

A light shielding plate 603 is attached to the imaging plane side of the rectilinear barrel 602 to block stray light. The rectilinear barrel 602 fits into the cam barrel 601, and the rectilinear barrel 602 is connected to the cam barrel 601 through bayonet connection so that the rectilinear barrel 602 is rotatably held by the cam barrel 601.

The linear sliding plate 604 has rectilinear keys (no reference numerals) that fit into key grooves (no reference numerals) of the rectilinear barrel 602 which extend in the optical axis direction, and rectilinear keys (no reference numerals) that fit into key grooves (no reference numerals) of a cover barrel 503. On an outer periphery of a ring portion of the linear sliding plate 604, rectilinear keys (no reference numerals) are formed at equal angular intervals. The rectilinear keys of the linear sliding plate 604 are connected to the cam cover 501 through bayonet connection so as to be rotatably held with respect to the cam cover 501, and are fit into key grooves (no reference numerals) formed on an inner circumferential surface of a fixed barrel 701 so as to prevent rotation.

The cover barrel 503, which is prevented from rotating by the linear sliding plate 604 and moves in the optical axis direction while being guided by the cam cover 501, is arranged outside the cam barrel 601. The key grooves (no reference numerals), into which rectilinear keys (no reference numerals) of the linear sliding plate 604 are fit, are formed on the inner circumferential surface of the cover barrel 503.

Cam pins 503a, which are projected outwardly in the radial direction, are arranged at equal angular intervals on the outer circumferential surface of the cover barrel 503. The cam pins 503a are inserted into cam grooves 501b that are formed on the inner circumferential surface of the cam cover 501. A cam cover ring 504, which reinforces and decorates the cover barrel 503, is attached to the subject side of the cover barrel 503.

Cam pins 501a, which are projected outwardly in the radial direction, are arranged at equal angular intervals on the outer circumferential surface of the cam cover 501. The cam pins 501a are inserted into cam grooves 701b that are formed on the inner circumferential surface of the fixed barrel 701. Moreover, a gear section (no reference numeral) that engages with a gear 715 is formed on the outer circumferential surface of the cam cover 501. The cam grooves 501b, into which the cam pins 503a of the cover barrel 503 are inserted, are formed on the inner circumferential surface of the cam cover 501 at equal intervals. Key grooves (no reference numerals) into which rotary keys (no reference numerals) of the cam barrel 601 are inserted are formed on the inner circumferential surface of the cam cover 501. A cam barrel ring 502, which reinforces and decorates the cam cover 501, is attached to the subject side of the cam cover 501.

Cam grooves 601c into which the cam pins 202a of the second lens frame 202 are inserted, and cam grooves 601d into which follower pins 303a of the third group base 303 are inserted are formed on the inner circumferential surface of the cam barrel 601 at equal intervals in the circumferential direction, respectively. Cam grooves 601a into which the cam pins 102a of the first lens frame 102 are inserted, and cam grooves 601b into which the cam pins 151a of the barrier barrel 151 are inserted are formed on the outer circumferential surface of the cam barrel 601 at equal intervals in the circumferential direction, respectively. Rotary keys (no reference numerals) that fit into key grooves (no reference numerals) of the cam cover 501 are formed on the outer circumferential surface of the cam barrel 601.

The cam barrel 601 is rotated with the rotation of the cam cover 501 through the connection between the rotary keys and the rotary grooves. The cam barrel 601 is connected with the cover barrel 503 through a bayonet connection so that the cam barrel 601 is rotatable with respect to the cover barrel 503 and moves in the optical axis direction with the cover barrel 503. The fixed barrel 701 is arranged outside the cam cover 501. Key grooves (no reference numerals) into which rectilinear keys (no reference numerals) of the linear sliding plate 604 are fit to prevent rotation are formed on the inner circumferential surface of the fixed barrel 701. Moreover, the cam grooves 701b into which the cam pins 501a of the cam cover 501 are inserted are formed on the inner circumferential surface of the fixed barrel 701 at equal intervals. Moreover, a sand protection sheet 704 that prevents dust particle invasion into the lens barrel is arranged at the subject side of the fixed barrel 701.

The lens barrel has a driving source 410 of the fourth lens group 400, a main guide 404 of the fourth lens group 400, a driving source 703 of the lens barrel, and a sensor holder 700 that holds gears 711, 712, 713, 714, and 715 for transmitting power of the driving source 703 to the cam cover 501. The gears 711 through 714 are held by the sensor holder 700 using a gear cover 702. The gear 715 is held by the fixed barrel 701 and the sensor holder 700.

The fourth lens group 400 has a fourth lens 401 and a fourth lens frame 402. A screw rod 411 is attached to the driving source 410. A nut 412 is screwed with the screw rod 411 so as to move in the optical axis direction with the rotation of the screw rod 411 driven by the driving source 410. The fourth lens group 400 is prevented from rotating with the main guide 404 and a sub guide mounted on the sensor holder 700. The fourth lens group 400 is movable in the optical axis direction together with the nut 412 by means of a function of a spring 403 that pushes the fourth lens frame 402 to the nut 412.

An image pickup device 800 is attached to the sensor holder 700. The image pickup device 800 is fixed to the sensor holder 700 with screws 830 while pushing a cover glass 820 to the sensor holder 700 using elasticity of a sensor rubber 810. The sensor holder 700 and the fixed barrel 701 are fixed with the screws 840, and thereby, the lens barrel is unified as a unit.

When the lens barrel shifts to the shooting state shown in FIG. 2 from the retracted state shown in FIG. 3, the gears 711 through 715 rotate by the power of the driving source 703, and the cam cover 501 rotates. Since the cam cover 501 fits inside the fixed barrel 701, the cam cover 501 is extended to the subject side in the optical axis direction while rotating by means of the function of the cam grooves 701b formed inside the fixed barrel. When the cam cover 501 rotates, the cam barrel 601 is extended to the subject side in the optical axis direction while rotating by means of the functions of the cam cover 501, the linear sliding plate 604, the rectilinear barrel 602, and the cover barrel 503.

Since the rectilinear barrel 602 is connected with the cam barrel 601 through a bayonet connection so as to be rotatable with respect to the cam barrel 601, and is prevented from rotating with functions of the linear sliding plate 604, the rectilinear barrel 602 linearly moves to extend to the subject side in the optical axis direction when the cam barrel 601 rotates. The first lens group 100, the barrier group 150, the second lens group 200, and the third lens group 300, which are connected to the cam barrel 601 with cam connections, linearly move to extend to the subject side in the optical axis direction by means of the functions of the cam barrel 601 and the rectilinear barrel 602.

The fourth lens group 400 is held so as to be movable in the optical axis direction with the functions of the screw rod 411 connected to the driving source 410 and the nut 412, and is prevented from rotating by the main guide 404 and the sub guide (no reference numeral). Accordingly, the fourth lens group 400 linearly moves to extend to the subject side in the optical axis direction independently regardless of movement of the cam barrel 601.

As mentioned above, when the cam cover 501 rotates, the respective lens groups extend toward the subject side from retracted positions, which shifts the lens barrel to the shooting state from the retracted state. It should be noted that the mutual distances among the lens groups are appropriately adjusted with the functions of the fixed barrel 701, the cam cover 501, and the cam barrel 601 so as to zoom.

Next, the image stabilization mechanism (IS) mounted on the third lens group 300 will be described in detail with reference to FIG. 4 through FIG. 11.

Figure 4:
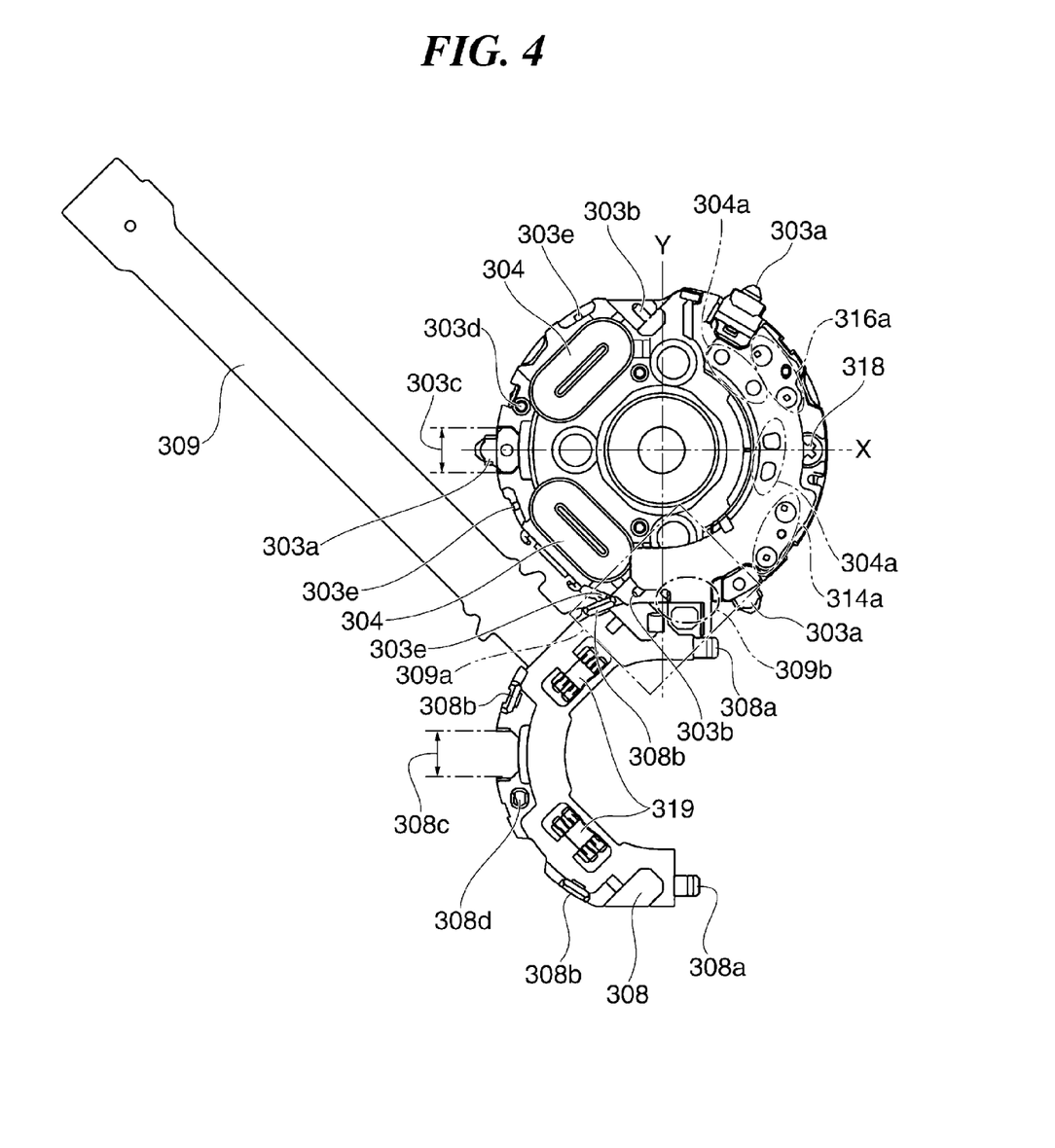
FIG. 4 is a plan view showing a configuration of a third lens group included in the lens barrel shown in FIG. 1 in a state where a third group FPC with which the third lens group is provided is expanded.
Figure 5:
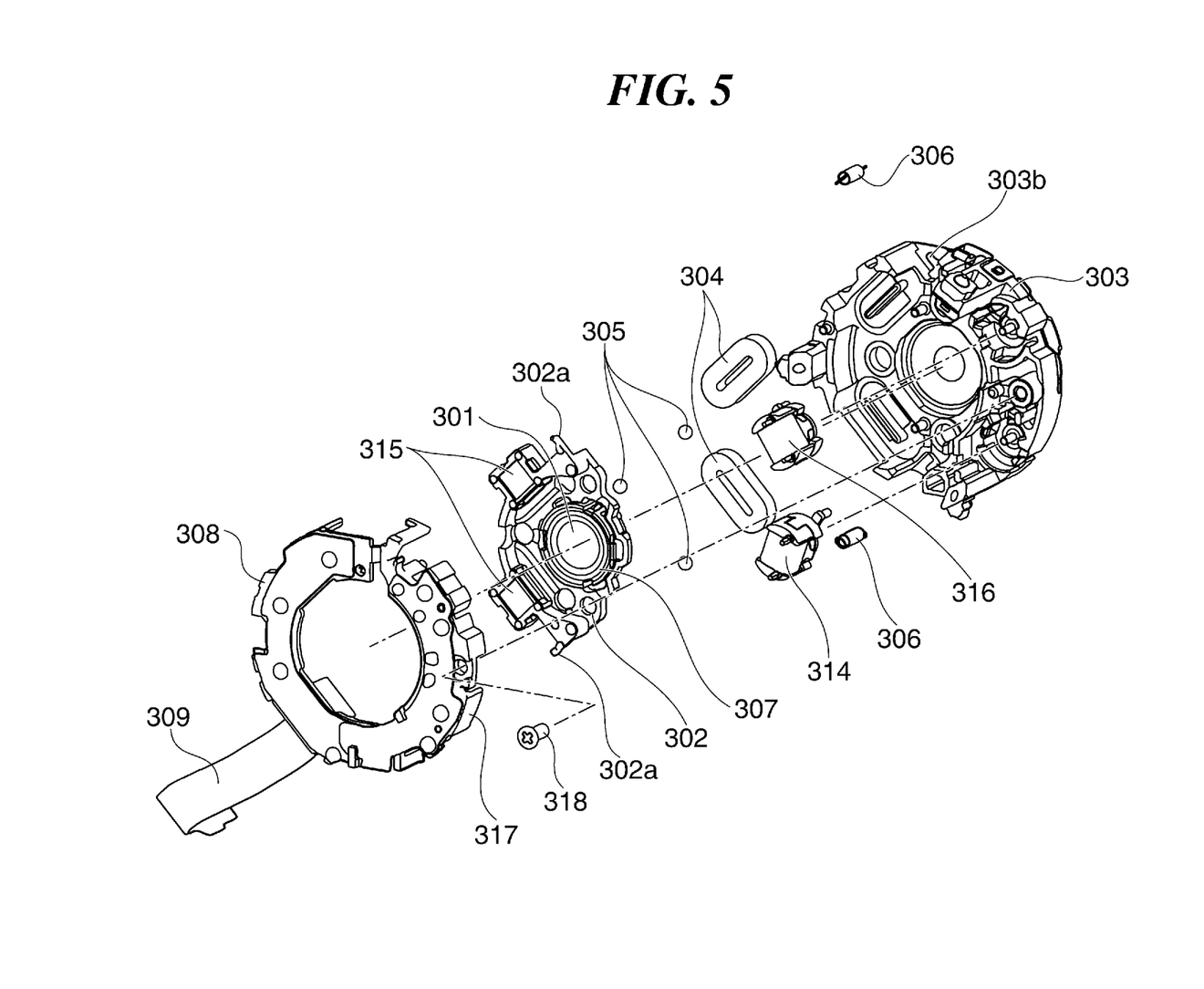
FIG. 5 is an exploded perspective view showing a configuration at a side of an image stabilization mechanism (an IS side) of the third lens group with which the lens barrel shown in FIG. 1 is provided.
Figure 6:
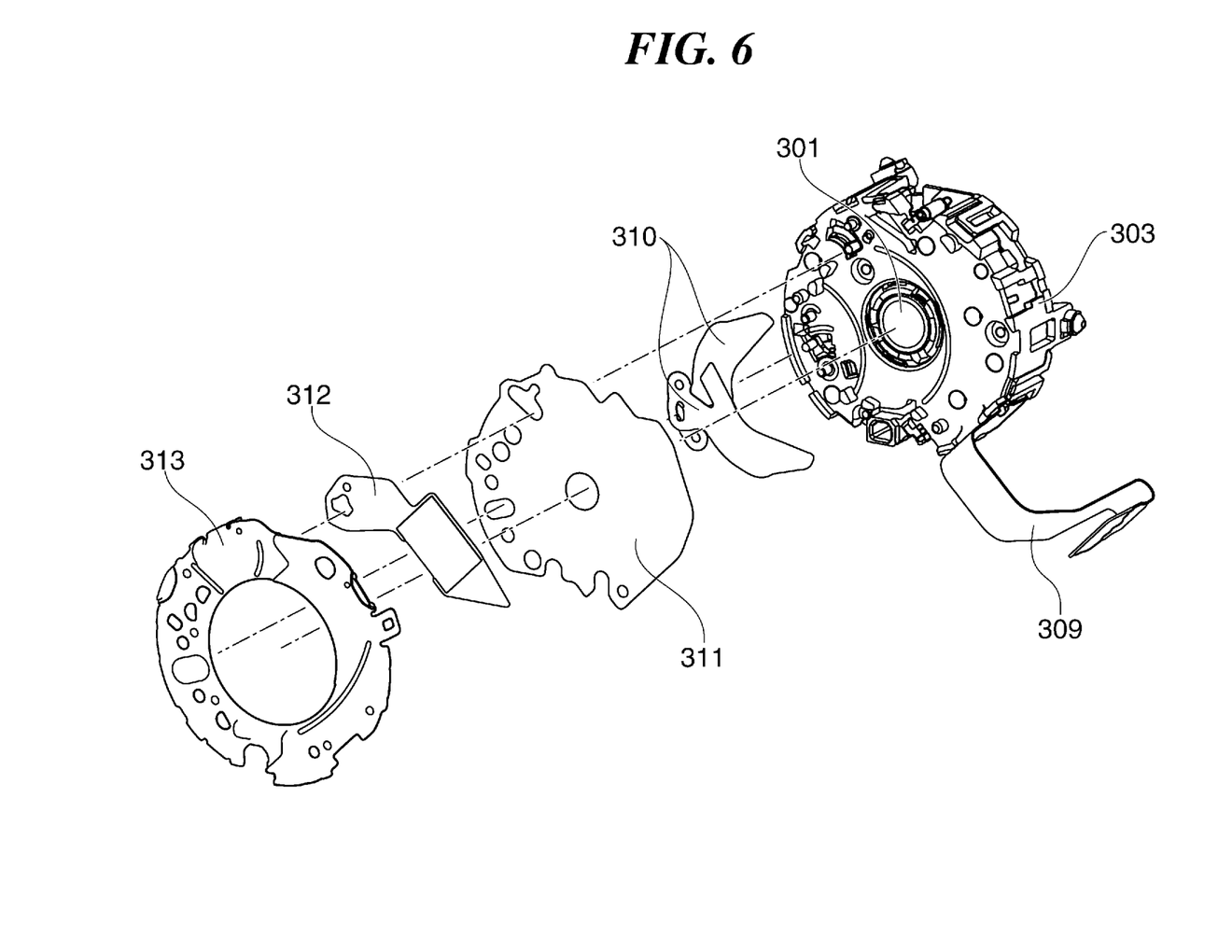
FIG. 6 is an exploded perspective view showing a configuration at a side of a shutter-diaphragm mechanism of the third lens group with which the lens barrel shown in FIG. 1 is provided.

First, the configuration of the third lens group 300 is described. The third lens group 300 is provided with the image stabilization mechanism and the shutter-diaphragm mechanism. FIG. 4 is a plan view showing the configuration of the third lens group 300 in a state where the third group FPC 309 with which the third lens group 300 is provided is expanded. FIG. 5 is an exploded perspective view showing a configuration at a side of an image stabilization mechanism (an IS side) of the third lens group 300. FIG. 6 is an exploded perspective view showing a configuration at a side of the shutter-diaphragm mechanism of the third lens group 300.

The third group base 303 is a base of the third lens group 300, and is provided with the three follower pins 303a that fit into the cam grooves 601d of the cam barrel 601. The third group base 303 is guided in the optical axis direction when the cam barrel 601 is driven because the follower pins 303a fit into the cam grooves 601d. Moreover, a shutter actuator 314 and a diaphragm actuator 316, which are drive members for driving the shutter blades 310, are attached to the third group base 303. An actuator cover 317 as a cover member covers the diaphragm actuator 316 and the shutter actuator 314 from the subject side. The actuator cover 317 is fixed to the third group base 303 by tightening with the screws 318. Thereby, the diaphragm actuator 316 and the shutter actuator 314 are fixed to the third group base 303.

The shutter actuator 314 and the diaphragm actuator 316 are arranged at the positions opposite to the IS coils 304 across the optical axis, respectively. It should be noted that each of the shutter actuator 314 and the diaphragm actuator 316 is constituted as a two-point actuator that switches a stop position of a drive arm between two points in response to the switch of polarity of supplied electric current.

The diaphragm actuator 316 has a (electric conduction) terminal section 316a for supplying electricity to the diaphragm actuator 316 via the third group FPC 309. The shutter actuator 314 has a (electric conduction) terminal section 314a for supplying electricity to the shutter actuator 314 via the third group FPC 309.

The third lens frame 302 holds the third lens 301 via the IS balls 305 so that the third lens 301 is relatively movable to the third group base 303 within a plane orthogonal to the optical axis. The cap 307 that cuts stray light from the subject side is fixed to the subject side of the third lens frame 302 using three claws that are formed to be extended in the optical axis direction. Moreover, IS magnets 315 are integrally attached to the third lens frame 302. One ends of the IS springs 306 are hung on hooks 302a formed on the third lens frame 302, respectively. The other ends of the IS springs 306 are hung on hooks 303b of the third group base 303.

The IS coils 304 are arranged at the positions to face the IS magnets 315 in the optical axis direction. The IS coils 304 are air-core coil, and are adhered and fixed in hollows formed on the third group base 303. The hollows of the third group base 303 for fixing the IS coils 304 are formed at positions almost opposite to the positions at which the diaphragm actuator 316 and the shutter actuator 314 are arranged on the third group base 303 across the optical axis.

It should be noted that the IS coils 304 are bobbinless units from which wirings are directly extended. This enables to arrange the IS coils 304 at positions almost opposite to the positions at which the diaphragm actuator 316 and the shutter actuator 314 are arranged across the optical axis, and enables to improve degree of freedom of the layout of the terminal sections 304a of the IS coils 304.

The third group FPC 309 has an opening/closing section 309a that enables to open and close the IS holder 308 to the third group base 303 under a condition where the IS holder 308 is soldered to the third group FPC 309. Then, the third lens frame 302 is detachable from the third group base 303 by opening and closing the IS holder 308.

In this embodiment, the terminal sections 304a of the IS coils 304, the terminal section 314a of the shutter actuator 314, and the terminal section 316a of the diaphragm actuator 316 are arranged within a half portion, in which the shutter actuator 314 and the diaphragm actuator 316 are included, of a projection area that is formed by projecting the third group base 303 onto a plane orthogonal to the optical axis. It should be noted that the Hall elements 319 are connected to the third group FPC 309, and are positioned with sufficient accuracy by fitting to the IS holders 308 with pressure.

As shown in FIG. 6, the shutter blades 310, the separate seat 311, the ND filter 312, and the shutter cover 313 are arranged sequentially from the third group base 303 at the imaging plane side of the third group base 303 in the state where the parts shown in FIG. 5 have been assembled.

Figure 7:
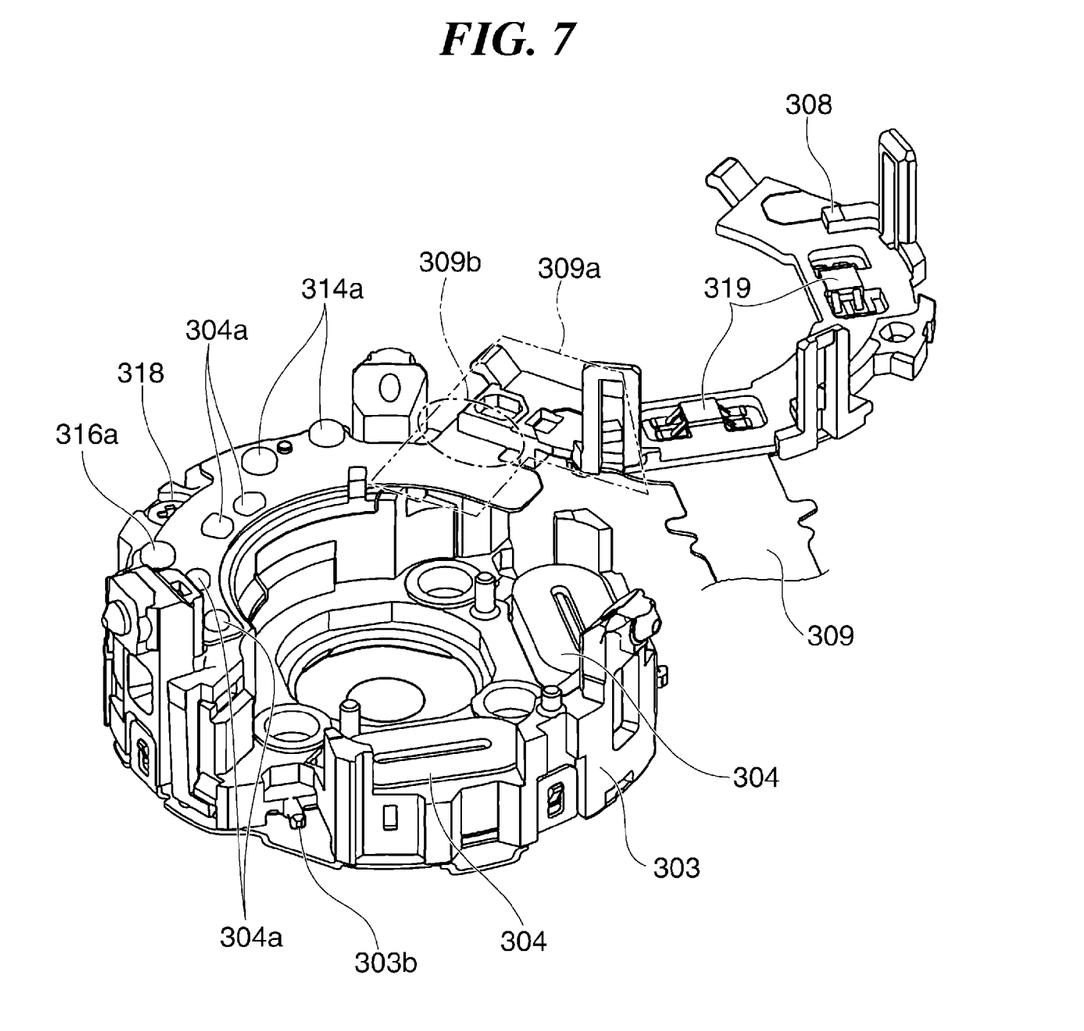
FIG. 7 is a perspective view showing a configuration of the third lens group included in the lens barrel shown in FIG. 1 in a state where the third group FPC with which the third lens group is provided is expanded.
Figure 8:
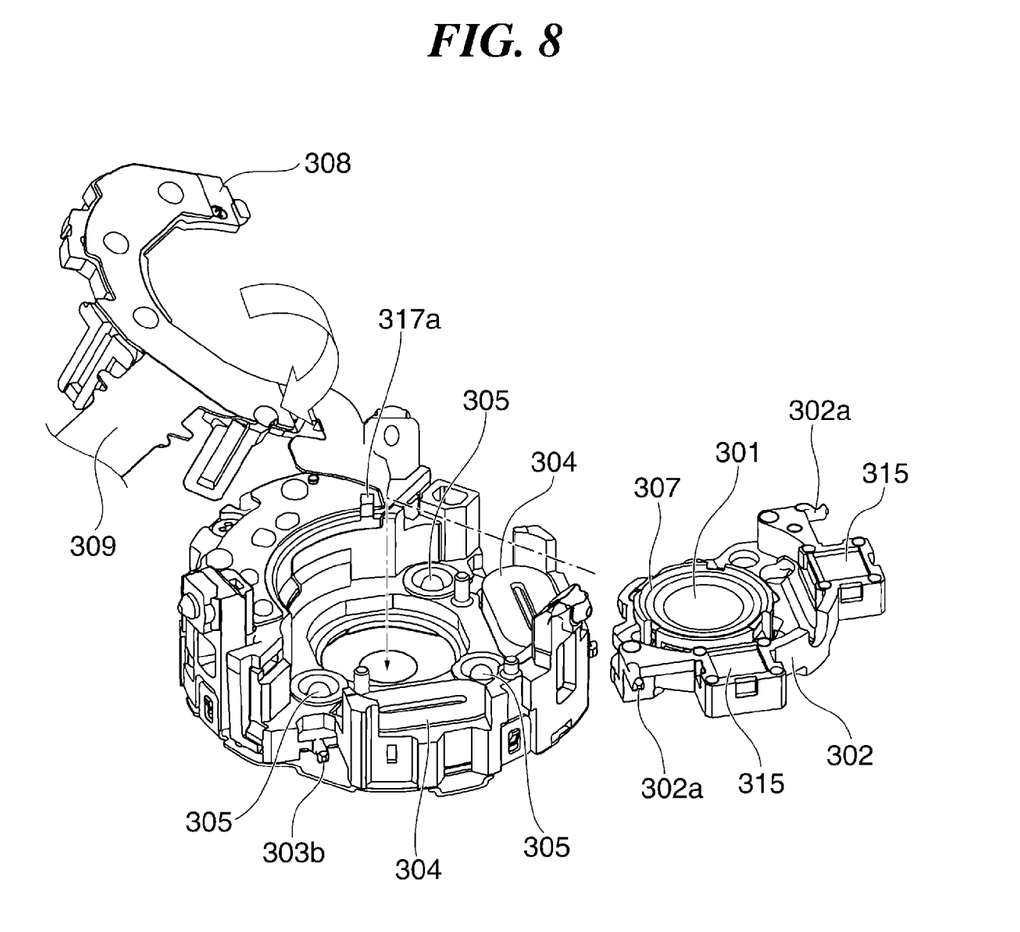
FIG. 8 is a perspective view showing a first assembly process of the third lens group with which the lens barrel shown in FIG. 1 is provided.
Figure 9:
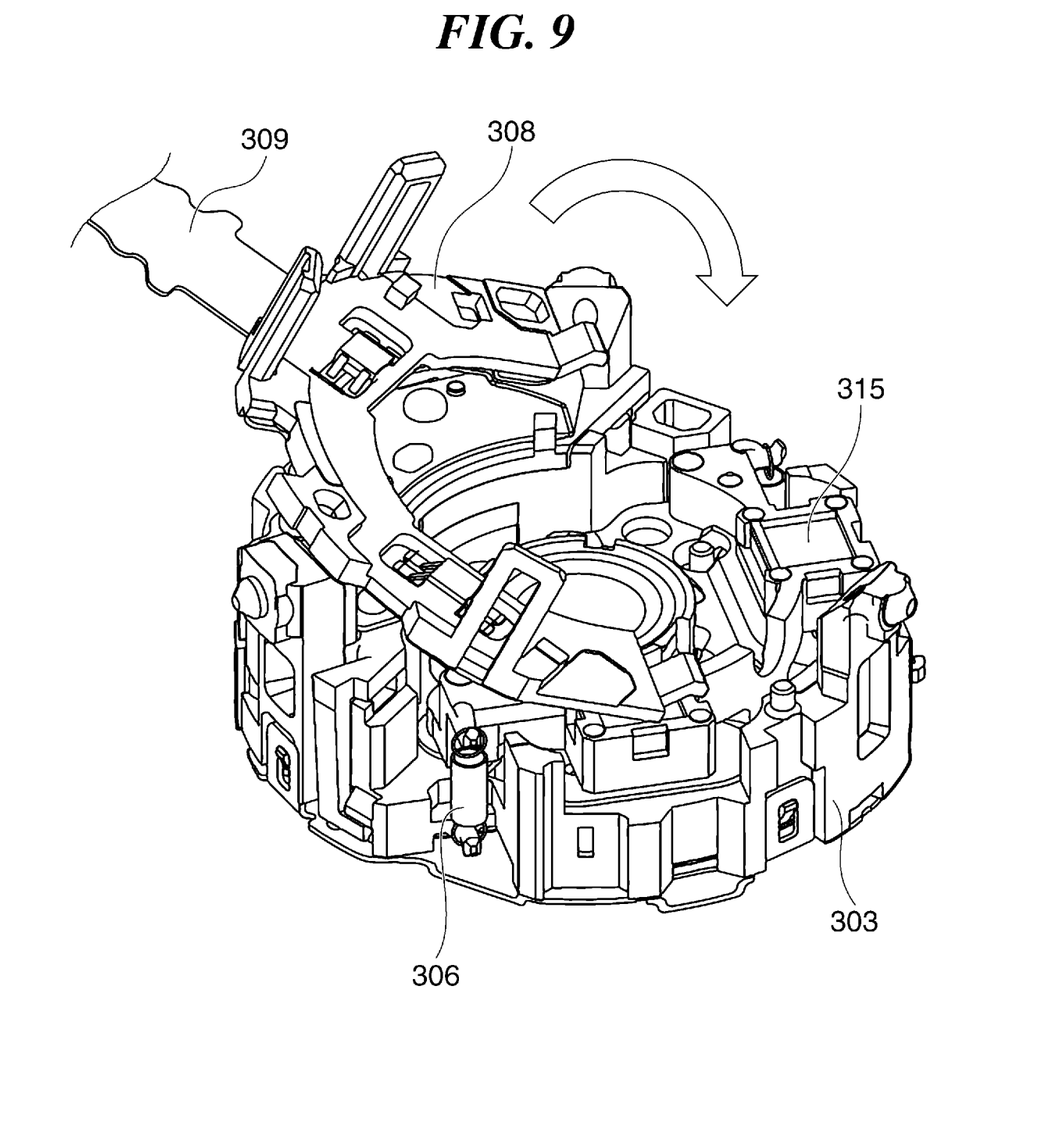
FIG. 9 is a perspective view showing a second assembly process of the third lens group with which the lens barrel shown in FIG. 1 is provided.
Figure 10:
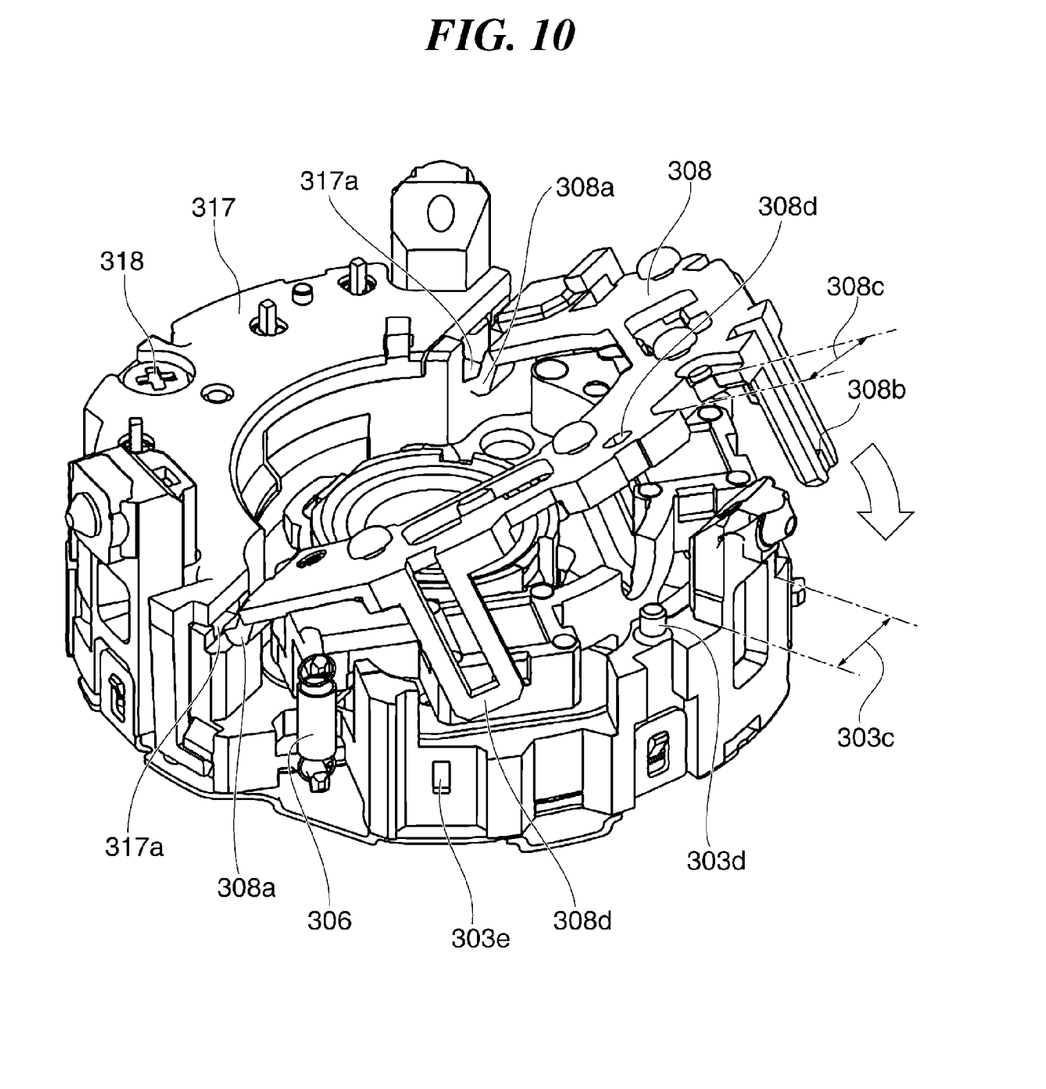
FIG. 10 is a perspective view showing a third assembly process of the third lens group with which the lens barrel shown in FIG. 1 is provided.
Figure 11:
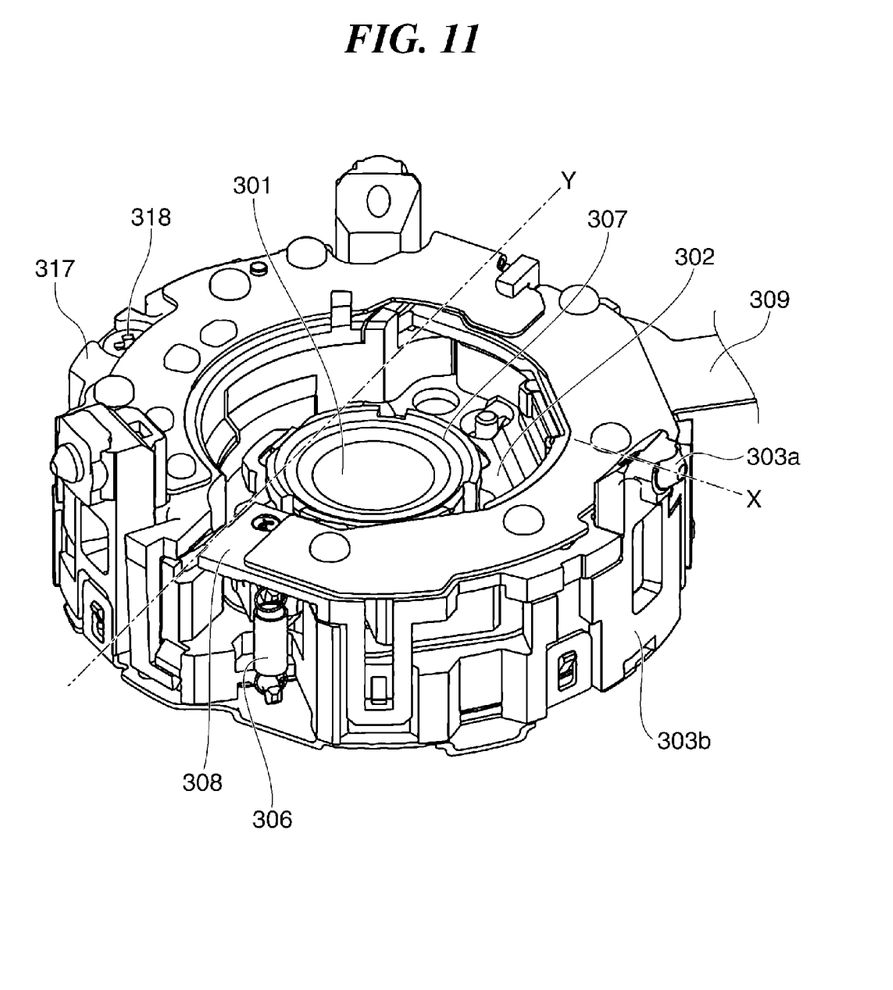
FIG. 11 is a perspective view showing the third lens group after finishing the assembly process shown in FIG. 10.

Next, an assembly process of the circumference of the third group base 303 in the third lens group 300 will be described. FIG. 7 is a perspective view showing the configuration of the third lens group 300 in a state where the third group FPC 309 with which the third lens group 300 is provided is expanded. FIG. 7 is a perspective view corresponding to the plan view in FIG. 4. FIG. 8 is a perspective view showing a first assembly process of the third lens group 300, and shows a state before inserting the third lens frame 302 into the third group base 303. FIG. 9 is a perspective view showing a second assembly process of the third lens group 300, and shows a state after inserting the third lens frame 302 into the third group base 303. FIG. 10 is a perspective view showing a third assembly process of the third lens group 300, and shows a process for attaching the IS holder 308 to the third group base 303. It should be noted that the third group FPC 309 is not illustrated in FIG. 10. FIG. 11 is a perspective view showing the third lens group 300 after finishing the assembly process shown in FIG. 10. That is, FIG. 11 shows the state where the third lens frame 302, the IS holder 308, and the third group FPC 309 are attached to the third group base 303.

When the third lens frame 302 is attached to the third group base 303, first, the third group FPC 309 to which the IS holder 308 is attached as shown in FIG. 7 is bent at near the terminal section 314a of the shutter actuator 314, and the IS holder 308 is lifted up. Here, the actuator cover 317 is provided with locking parts (hooks) 317a that control the bending position of the third group FPC 309 and support bending. Accordingly, the third group FPC 309 can be smoothly opened and closed, and the loads to the terminal sections 314a and 316a of the shutter actuator 314 and the diaphragm actuator 316 and the loads to the terminal sections 304a of the IS coils 304 are reduced.

After the third lens group 300 becomes the state shown in FIG. 8, the IS balls 305 are arranged to specified positions. Then, the third lens frame 302 is inserted into the third group base 303, and the IS springs 306 are hung between the hooks 302a of the third lens frame 302 and the hooks 303b of the third group base 303. Thereby, the third lens group 300 becomes the state shown in FIG. 9, and the third lens 301 is held so as to be relatively movable to the third group base 303. Next, the IS holder 308 and the Hall elements 319 are attached to the third group base 303 while folding the third group FPC 309 as shown in FIG. 9 and FIG. 10, and thereby, the state shows in FIG. 11 is obtained. It should be noted that the IS balls 305 and the third lens frame 302 (the third lens 301) can be taken out according to a procedure reverse to the above-mentioned procedure.

Here, the terminal sections 314a and 316a of the shutter actuator 314 and the diaphragm actuator 316, the terminal sections 304a of the IS coils 304, and the Hall elements 319 are arranged in the opposite orientations in the assembled state. Accordingly, a conventional FPC (corresponding to the third group FPC 309) became a double-sided mounting, which causes a problem of increasing a cost.

On the other hand, in this embodiment, the third group FPC 309 has the opening/closing section 309a for opening and closing the IS holder 308 between the section in which the terminal sections 314a, 316a, and 304a are provided on the third group FPC 309 and the section in which the Hall elements 319 are provided. Then, a hemming bending (bending at 180 degrees) section 309b is provided in a part of the opening/closing section 309a. Accordingly, since the third group FPC 309 is bent by the hemming bending section 309b, and the IS holder 308 is attached so as to cover the third lens frame 302, the terminals 314a, 316a, 304a, and the Hall element 319 can be arranged in the opposite orientations in the assembled state. Moreover, since there is the hemming bending section 309b, the terminals 314a, 316a, 304a, and the Hall elements 319, which are arranged in the opposite orientations in the assembled state, can be arranged on the same side during the assembling. Accordingly, an FPC can be a single-sided mounting like the third group FPC 309, which can reduce the cost of the FPC.

Incidentally, when a Y-axis is defined to the third group base 303 so as to intersect perpendicularly with the optical axis and so as to divide the actuator side and the IS coil side as shown in FIG. 4 and FIG. 11, the Y-axis is a rotation center axis at the time of attaching the third group FPC 309 and the IS holder 308 to the third group base 303. Moreover, when the digital camera is positioned in a regular position (a state where a camera is placed on a horizontal table), the Y-axis becomes parallel to a vertical direction (see FIG. 1). In the third group base 303, one of the follower pins 303a is arranged so as to project in an X-axis direction (parallel to a horizontal direction) that intersect perpendicularly with the Y-axis and the optical axis at the side opposite to the actuator side across the Y-axis. As shown in FIG. 4 and FIG. 10, a positioning section 303c that positions the IS holder 308 in the vertical direction is formed at a root of the follower pin 303a projected in the X-axis direction. Moreover, the third group base 303 is provided with a positioning boss 303d that positions the IS holder 308 in the horizontal direction near the positioning section 303c.

On the other hand, the IS holder 308 is provided with locking parts 308a to the actuator cover 317 and claws 308b to the third group base 303, and is provided with a vertical location notch 308c and a horizontal location hole 308d. Then, the locking parts 308a and the claws 308b are provided apart in the circumferential direction.

Accordingly, when the IS holder 308 is attached to the third group base 303, the locking parts 308a of the IS holder 308 are first hung on the locking parts 317a of the actuator cover 317. In the state, the IS holder 308 is rotated around the rotation axis in the direction indicated by an arrow shown in FIG. 10 so as to engage the claws 308b of the IS holder 308 to hooks 303e of the third group base 303. At this time, according to the above-mentioned configuration, the follower pin 303a does not disturb the rotation of the IS holder 308, and the IS holder 308 is positioned at the same time when it is attached. That is, since the hooks 308b of the IS holder 308 and the locking parts 308a are provided apart in the circumferential direction, the IS holder can be attached smoothly.

Moreover, the locking parts 308a are hung on the locking parts 317a of the actuator cover 317 that are fixed with the screws 318. Moreover, since the hooks 308b and the locking parts 308a are provided apart in the circumferential direction, the IS holder 308 can be strongly attached to the third group base 303. Thereby, even if external shock is applied to the lens barrel, the contents, such as the third lens frame 302 and the IS balls 305, stored in the third group base 303 are prevented from jumping out.

As described above, the lens barrel of this embodiment enables to facilitate attachment and detachment of the third lens frame 302 or the IS balls 305 that constitutes the image stabilization mechanism with a cheap and easy configuration.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-272576, filed on Dec. 13, 2012, which is hereby incorporated by reference herein in its entirety.

What is claimed is:

1. A lens barrel comprising:
an image stabilizing actuator configured to have a coil and a magnet that are arranged so as to face to each other;
a first holding member configured to hold the coil;
a second holding member configured to hold the magnet, and to be movable in a direction orthogonal to an optical axis with respect to said first holding member;
a sensor configured to detect moving amount of said second holding member in the direction orthogonal to the optical axis;
a third holding member configured to hold said sensor; and
a flexible printed circuit board to which said first holding member and said third holding member are attached,
wherein a terminal section of the coil held by said first holding member and a terminal section of the sensor held by said third holding member are located on the same side of said flexible printed circuit board, and
wherein said third holding member is bent toward said first holding member.

2. The lens barrel according to claim 1, further comprising:
a diaphragm actuator; and
a shutter actuator,
wherein said first holding member holds said coil, the terminal section of said coil, a terminal section of said diaphragm actuator, and a terminal section of said shutter actuator, and
wherein all of the terminal section of said coil, the terminal section of said diaphragm actuator, and the terminal section of said shutter actuator are located within one portion in a projection area that is formed by projecting said first holding member onto a plane orthogonal to the optical axis, when the projection area is divided into two portions by a straight line that intersects the optical axis.

3. The lens barrel according to claim 1, wherein said third holding member and said coil are located in different portions in a projection area that is formed by projecting said first holding member and said third holding member onto a plane orthogonal to the optical axis, when the projection area is divided into two portions by a straight line that intersects the optical axis and when said third holding member is opened from said first holding member.

4. The lens barrel according to claim 1, wherein said second holding member can be attached and detached by opening and closing said third holding member to said first holding member.

5. The lens barrel according to claim 2, wherein the terminal section of said coil held by said first holding member and the terminal section of said sensor held by said third holding member are located on the same side, when said third holding member is opened from said first holding member.

6. The lens barrel according to claim 1, wherein said flexible printed circuit board has a hemming bending section that enables to open and close said third holding member to said first holding member.

7. A lens barrel comprising:
an image stabilizing actuator configured to have a coil and a magnet that are arranged so as to face to each other;
a first holding member configured to hold the coil;

a second holding member configured to hold the magnet, and to be movable in a direction orthogonal to an optical axis with respect to said first holding member;
a sensor configured to detect moving amount of said second holding member in the direction orthogonal to the optical axis;
a third holding member configured to hold said sensor; and
a flexible printed circuit board to which said first holding member and said third holding member are attached,
wherein terminals of the coil held by said first holding member and terminals of the sensor held by said third holding member are located on the same side of said flexible printed circuit board, and
wherein said third holding member is bent toward said first holding member and is attached to said first holding member.

8. The lens barrel according to claim 7, wherein the bending section of said third holding member is a hemming bending section.

9. An image pickup apparatus equipped with the lens barrel according to claim 1.

* * * * *